W. C. DANIEL.
MUD BLOCK.
APPLICATION FILED NOV. 24, 1917.
1,269,398.
Patented June 11, 1918.
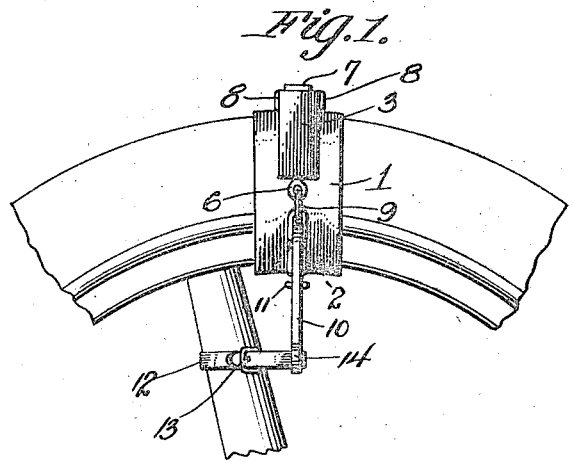
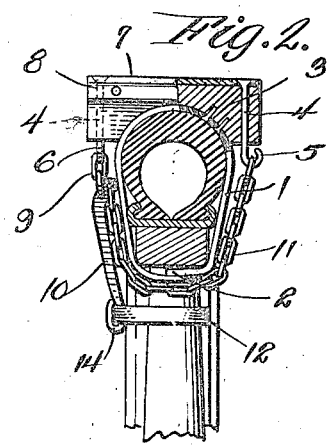
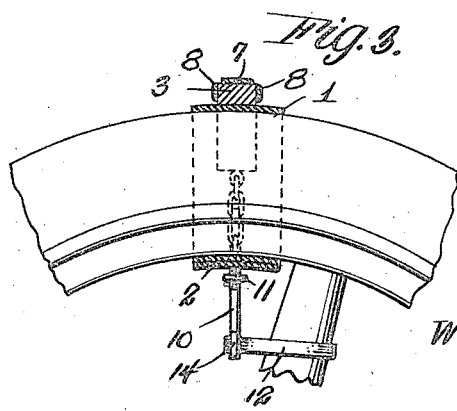
INVENTOR
Willie C. Daniel.
WITNESSES

UNITED STATES PATENT OFFICE.

WILLIE C. DANIEL, OF LOUISA, VIRGINIA.

MUD-BLOCK.

1,269,398.

Specification of Letters Patent.   Patented June 11, 1918.

Application filed November 24, 1917.   Serial No. 203,746.

*To all whom it may concern:*

Be it known that I, WILLIE C. DANIEL, citizen of the United States, residing at Louisa, in the county of Louisa and State of Virginia, have invented certain new and useful Improvements in Mud-Blocks, of which the following is a specification.

This invention relates to automobile mud shoes and more particularly to a mud block adapted for attachment to the rear wheel of an automobile for the purpose of enabling the automobile to utilize its own power for pulling itself out of the mud or a deep rut in a muddy roadway.

One of the principal objects of the invention is to provide a mud block of this character that may be readily attached to the automobile wheel where it may be fixedly secured so that it will be held in position on the wheel to permit a firm grip to be obtained when the wheel is turned and thus force the automobile forwardly when power is applied to the wheel.

The invention also aims at the provision of a device of this character that will include a novel fastening means adapted to be easily operated whereby a firm grip may be obtained without requiring fastening bolts or clamps such as are generally employed on devices of this character.

It is also my purpose to provide a device of this character that will be adapted for attachment to the automobile wheel without necessarily doing any damage or harm to the same and which may be readily attached or detached with a minimum exertion.

A further object of the invention is the provision of a device of this character which consists of comparatively few parts and is simple in construction but durable and well adapted to withstand the rough usage to which devices of this character are ordinarily subjected.

For a full description of the invention and the advantages and merits thereof, reference is to be had to the following description and the accompanying drawings wherein is illustrated the preferred form of my invention in which:

Figure 1 is a fragmentary elevation of a portion of an automobile wheel showing the device attached thereto.

Fig. 2 is a cross section partly in elevation showing the device in operative position.

Fig. 3 is a transverse section showing the automobile wheel in elevation.

Referring to the drawing wherein is illustrated the preferred form of my invention and in which like numerals of reference indicate corresponding parts throughout the several views, a protective band 1 is provided which is preferably constructed from a strip of leather of suitable thickness although it will be understood that felt, heavy fabric or other suitable material may be employed for this protective covering. It should be long enough to extend around the tire and rim and felly of the wheel and having its meeting ends overlapped as indicated at 2 in Fig. 2 of the drawing. The intermediate portion of this protective covering is curved to fit over the tread of the tire, and attached to this curved portion is a block 3 which, by referring to Fig. 2 it will be observed extends outwardly laterally at opposite sides for a considerable distance beyond the sides of the tire and is riveted to the protective covering 1.

Through the laterally projecting portions of the block I have provided a bolt 4 one of which is arranged at each end of the block and the ends of the bolts are extended beyond the block and shaped to form a hook 5 and eye 6, the opposite ends of the bolts are provided with counter sunk heads which engage a wearing plate 7 mounted on the outer face of the block and this plate should be of metal or other durable material.

Attached to each side of the block and extending along the marginal edge thereof, is a cleat 8 which is also of metal and it will be observed that these plates 7 and 8 engage the ground and thus prevent any material wear on the wooden block 3.

Attached to the eye 6 is a pair of links of a chain 9 and an operating or binding lever 10 has its short end projected slightly beyond the pivotal connection of the lever with the link, and the terminal of this short end is joined to an elongated chain 11, the end link of which is engaged by the hook 5 when the device is applied.

As shown to advantage in Fig. 2, when the lever has its long end swung outwardly the tension on the chain 11 may be released to permit the link to be disengaged from the hook 5 and when the lever is thrust and pushed inwardly toward the spokes of the wheel, the chain will be drawn taut for maintaining the block in tight engagement with the tire.

The lever 10 is held through the medium of a fastening band 12 which may consist of a leather strap or the like buckled together as indicated at 13. Thus it will be apparent that it is merely necessary to pull the strap into engagement with the spokes of the wheel and buckle the ends of the strap together to hold the lever 10 in locked position since, it will be noted, the end of the lever has a loop 14 adapted to receive the band 12.

When the block has been mounted in position on the tire and the lever 10 swung into operative position, the chain will be drawn taut and consequently the block will be tightly bound to the tire. The strap 12 will then be placed around one of the adjacent spokes of the wheel and passed through the loop 14 in the end of the lever after which the ends of the strap will be buckled together thus holding the lever against swinging. The chain 11, of course, may be engaged with the hook by means of any one of the links in the chain so that tires of smaller size may be accommodated. When the wheel is rotated, the sides of the block will present a relatively wide expanse of flat surface which will engage the mud and thus obtain a firm grip for forcing the wheel out of its embedded position.

From the foregoing it will be observed that a very simple and durable mud shoe has been provided the details of which embody the preferred form. I desire it to be understood, however that slight changes may be made in the minor details of construction without departing from the spirit of the invention or the scope of the claims hereunto appended.

I claim:

1. A mud block for automobile wheels comprising a block shaped to fit over the tire and having a substantially semi-circular recess formed therein for the reception of the tire, a protective covering attached to the block in the said recess and adapted to embrace the said tire and the wheel felly and means attached to the block and extending around the protective covering to maintain the said block in tight engagement with the tire.

2. A mud block for automobile wheels comprising a protective covering of flexible material adapted to embrace the tire and the wheel felly, the said covering including an elongated strip having its ends overlapped on the said felly, a block attached to the said strip and fitting over the said tread and projecting laterally beyond the sides of the tire, and means carried by the said block and adapted to extend around the said felly for maintaining the said block in tight engagement with the tire.

3. A mud block for attachment to automobile wheels comprising a strip of flexible material embracing the wheel tire and extending around the wheel felly, the said strip having its end overlapped on the said felly, a block having its ends projected beyond opposite sides of the tire and provided intermediate its length with a substantially semi-circular recess, means for fixing the said strip in the said recess, and means attached to the said extended ends of the block and extended around the said felly for securing the blocks in tight engagement with the tire.

In testimony whereof I affix my signature in presence of two witnesses.

WILLIE C. DANIEL.

Witnesses:
J. S. WILLS,
F. W. DICKINSON.